(12) United States Patent
Melrose (10) Patent No.: US 11,837,104 B2
(45) Date of Patent: Dec. 5, 2023

(54) BOX STRING INSTRUMENT SIMULATOR

(71) Applicant: Nicole Melrose, Dallas, TX (US)

(72) Inventor: Nicole Melrose, Dallas, TX (US)

( * ) Notice: Subject to any disclaimer, the term of this patent is extended or adjusted under 35 U.S.C. 154(b) by 0 days.

(21) Appl. No.: 17/816,124

(22) Filed: Jul. 29, 2022

(65) Prior Publication Data

US 2023/0030002 A1 Feb. 2, 2023

Related U.S. Application Data

(60) Provisional application No. 63/262,058, filed on Oct. 4, 2021, provisional application No. 63/203,742, filed on Jul. 29, 2021.

(51) Int. Cl.
| | |
|---|---|
| *G09B 15/02* | (2006.01) |
| *G10G 1/02* | (2006.01) |
| *G09B 15/00* | (2006.01) |
| *G10G 7/00* | (2006.01) |

(52) U.S. Cl.
CPC ............ *G09B 15/026* (2013.01); *G09B 15/00* (2013.01); *G10G 1/02* (2013.01); *G10G 7/00* (2013.01)

(58) Field of Classification Search
CPC .................................................. G09B 15/026
See application file for complete search history.

(56) References Cited

U.S. PATENT DOCUMENTS

| | | | | |
|---|---|---|---|---|
| 1,275,202 A | * | 8/1918 | Becker ..................... | G10D 1/02 84/274 |
| 1,307,557 A | * | 6/1919 | Lang ........................ | G10D 3/16 84/282 |
| 2,239,579 A | * | 4/1941 | Solodar ................... | G10D 3/166 84/283 |
| 3,188,901 A | * | 6/1965 | Baderak .................. | G10D 3/166 984/122 |
| 4,554,859 A | * | 11/1985 | Hanly ..................... | G09B 15/06 84/283 |
| 5,355,757 A | * | 10/1994 | Plummer ................ | G10D 3/166 84/283 |
| 5,670,727 A | * | 9/1997 | Xiao ........................ | G09B 15/06 84/283 |
| 8,314,316 B1 | * | 11/2012 | Erwin ...................... | G10D 3/16 84/282 |
| 10,665,212 B2 | * | 5/2020 | Volozhanin ............ | G10D 3/166 |
| 2009/0211432 A1 | * | 8/2009 | Casillas .................. | G09B 15/06 84/465 |
| 2019/0333484 A1 | * | 10/2019 | Volozhanin ............ | G10D 3/166 |
| 2022/0005375 A1 | * | 1/2022 | Carter ..................... | G09B 15/06 |
| 2023/0030002 A1 | * | 2/2023 | Melrose .................. | G09B 15/06 |
| 2023/0032444 A1 | * | 2/2023 | Melrose .................. | G10D 3/16 |

FOREIGN PATENT DOCUMENTS

WO WO-2016169014 A1 * 10/2016

* cited by examiner

*Primary Examiner* — Robert W Horn
(74) *Attorney, Agent, or Firm* — Scott C Harris, Esq (57) ABSTRACT

A simulated musical string instrument formed of plural shaped sheets of rigid material, such as cardboard. There is a top sheet forming a top surface of the simulated string instrument body, and a bottom sheet forming a bottom surface, and multiple sheets between. A simulated fingerboard is attached to the top surface. The top sheet and fingerboard gets stickers that show parts of the simulated string instrument body including openings and notes. There is also a simulated bow guide and a simulated bow.

13 Claims, 9 Drawing Sheets

BOX STRING INSTRUMENT SIMULATOR

This application claims priority from Provisional application No. 63/203,742, filed Jul. 29, 2021, and from Provisional application No. 63/262,058, filed Oct. 4, 2021, the entire contents of both of which are herewith incorporated by reference.

BACKGROUND

Trainer string orchestra instruments are designed to help beginning students learn and practice their position, form, and bow technique before graduating to a real violin, viola, cello, or bass instrument.

People currently and historically have used macaroni, cereal, or other empty food container boxes to create trainer violins or violas. These food containers are often the incorrect shape and size to adequately help students practice their technique, form, and position on string instruments.

Current trainer cellos typically utilize very expensive materials and are not affordable for the average family. We are not aware of any trainer bass instrument that exists on the market.

The trainer string instruments that exist on the market currently are limited to very small sizes, so they are not adequate for larger children, teenagers, or adults. Most trainer instruments are typically not very durable, and this is a common complaint regarding foam trainer violins. They do not involve an instrument construction process which promotes the learning of the music student, and they do not include adequate representation of the various parts of each instrument to help the student learn the parts of the violin.

Current simulated instruments are not durable, and do not provide the proper effect during simulated instrument play. These simulated devices, therefore do not provide the sense of understanding bow pressure to create sound on the instrument.

SUMMARY OF THE INVENTION

The inventor recognized that there are a number of drawbacks with the current systems.

The present application describes a series of trainer string orchestra instruments designed to help beginning students learn about the instrument, and also practice their position, form, and bow technique, before graduating to a real violin, viola, cello, or bass instrument. The invention helps students to learn how to hold the instrument, and to practice left and righthand position and posture. The invention is a kit that provides students, teachers, and parents with the opportunity to learn the parts of the instrument through constructing the kit, and adding stickers representing the different parts of the instrument.

My invention is totally unique from others out there in that it is constructed from lightweight and durable materials, it is affordable, and it is hands-on built by students.

BRIEF DESCRIPTION OF THE DRAWINGS

In the Drawings:
the figures show aspects of the invention, and specifically.

DETAILED DESCRIPTION

The present application describes a system for providing a cardboard kit of string instrument trainers. The systems as described herein are applicable to any of a number of different string instruments, however according to embodiments some specific string instruments and their specific construction techniques, are described herein. An embodiment describes this kit being used for violin. It should be understood, however, that the kit can be made in different sizes, to simulate not only a violin, but also as described herein, a viola, a cello, a bass, or any other stringed instrument and in a preferred embodiment a string instrument which uses a bow.

It should be understood that the invention is not limited to the specific instruments which are described herein, which are considered different embodiments of the more general invention.

The purposes of the Box Instrument Series include the following:

1. Allow students the hands-on experience of constructing an instrument, and learning the parts of the instrument through stickers, by placing the stickers in the right places on the instruments. This experience gives students the opportunity to learn in a tactile way, rather than just simply unboxing something already constructed. Placing the stickers on the instrument helps students to learn the different parts of the instrument, which assists the student's journey as they continue to learn their instrument.

2. When learning a string instrument, one of the most difficult parts is learning to hold the bow and the instrument in a way that will create successful playing. A string instrument is an incredibly meticulous instrument because it requires the instrument to sit positioned in a very specific way, it requires the bow to be held a specific way, and also importantly, it requires the bow to move in a straight line across the strings in order to draw out a sound that will speak clearly and not be scratchy. In addition, the height of the bow arm must be in exactly the right place on the string, or the bow will hit other strings, and the instrument will be impossible to play in a beautiful tone.

3. The box instrument simulator allows beginner students to learn how to hold the bow on the dowel rod. The 3D printed bow of the embodiment is considerably lighter than a heavy bow. This is extremely important because the bow requires fine motor skills to be activated in an exact way. By learning to build the bow hand on a trainer instrument, students can build strength and skill at the same time. The instrument is constructed in an exact length to suit the length of the player's arms. When the students place the bow into the bow guide, students will learn how to draw a bow in a straight way, activating the correct part of the arm that draws a straight bow. When students have a beautiful bow hand and correct bow, the sound against the bow guide can be heard in a "shhhh" manner, which will translate exactly to the sound that the bow will make on a real instrument.

An important feature of the present application is the ability to hold a simulated bow against the box instrument simulator in a way that can cause a recognizable sound of this type.

4. Once the beginner student has gone through the process of learning to hold the instrument on their shoulder, and constructing a correct bow hand in addition to drawing a straight bow through the bow guide, the student will have the skills needed to move on to a real instrument. This process creates almost instant success on a real instrument, and decreases the chances of a student quitting because of the difficulty of playing a string instrument. Students who learn on My box instrument series can go straight to the violin, viola, cello, or bass immediately with the knowledge and ability of learning how to draw a beautiful sound without the distraction of hitting strings, making scratchy sounds, and therefore, will be less likely to quit and will be more likely to be successful.

Box Violins:

As described herein, students construct their own trainer instruments. A kit as described herein includes a sticker sheet with parts that fit perfectly onto each sized instrument.

Figure 1:
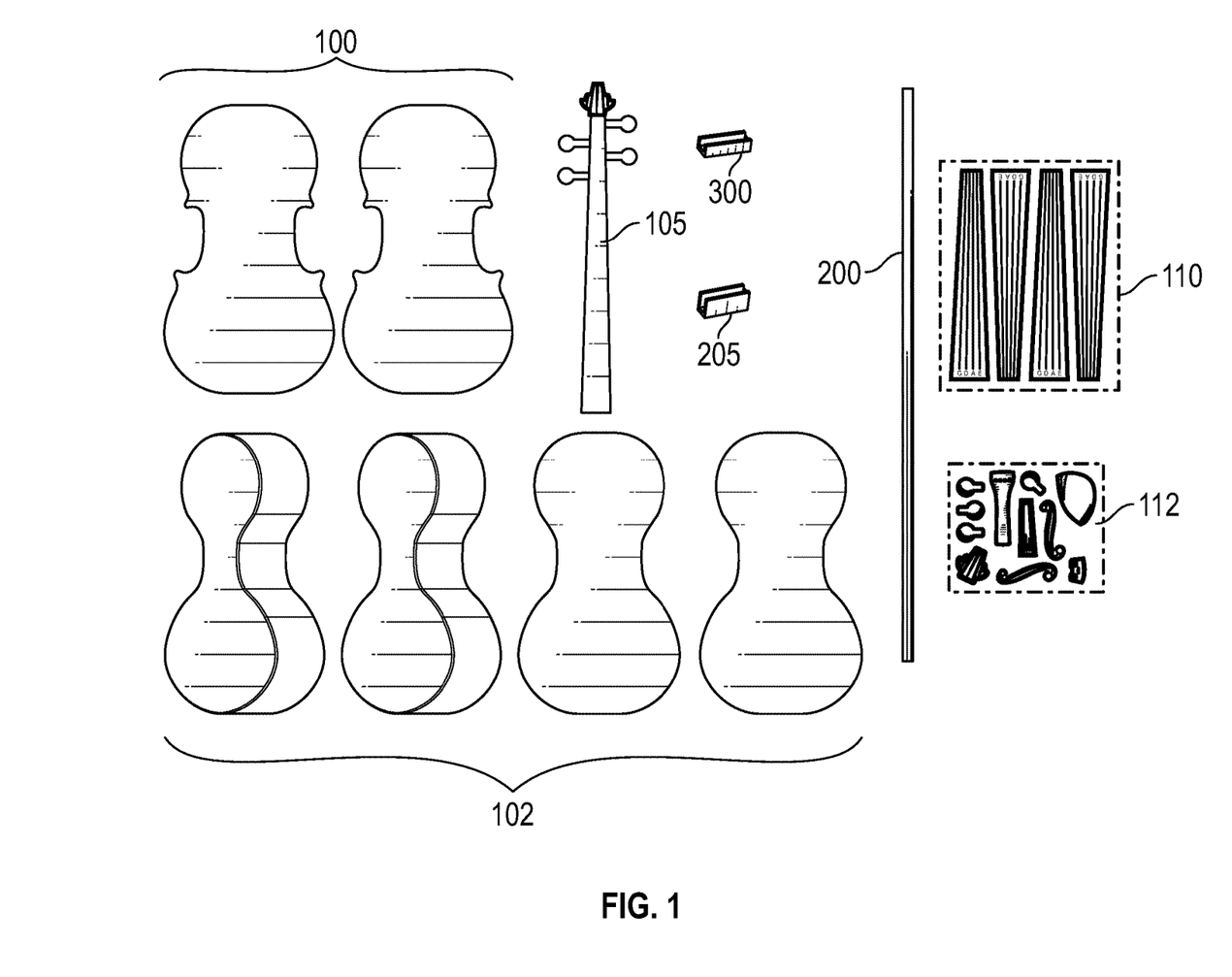
FIG. 1 shows the parts of a kit of according to a first embodiment for a violin body including body, fingerboard and other parts.

The simulated violin kit is shown in FIG. 1.

The kit includes two cardboard violin bodies 100 that are shaped in the body of a real violin that make-up the top and bottom of the instrument. 3-4 cardboard sandwiches 102 (depending on the size/thickness of the instrument) are stacked and glued on each other and between the bodies 100. This creates a violin that is formed of a sandwich of cardboard sheets, and is hence stable when constructed.

A cardboard fingerboard 105 is attached to the top body once the bodies and the sandwiches are constructed.

Figure 2:
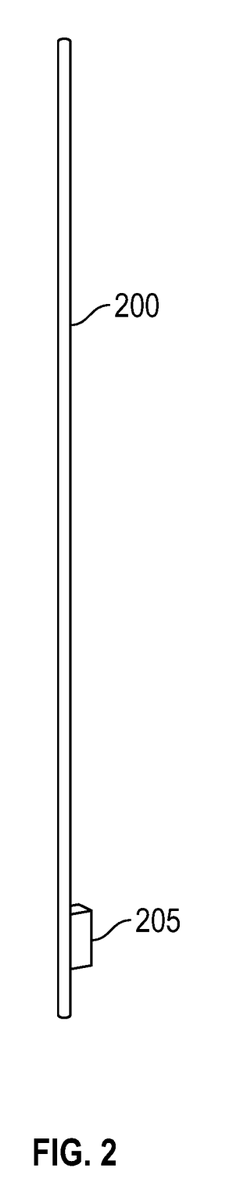
FIG. 2 shows a simulated bow for the kit.
Figure 3:
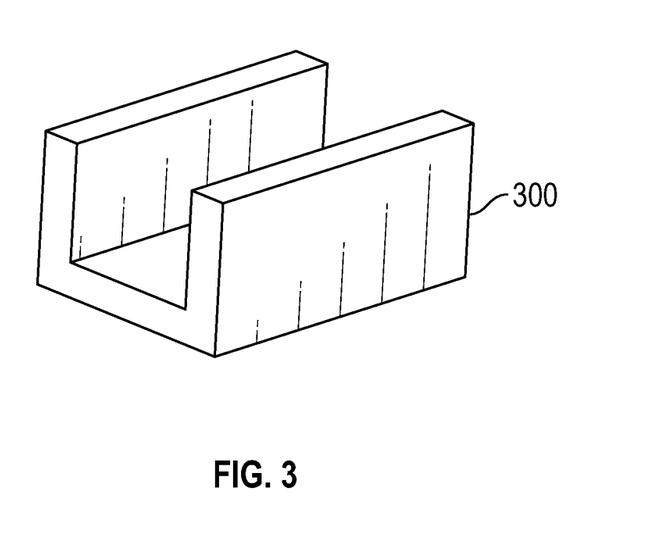
FIG. 3 shows a bow guide.

The top body has a bow guide 300 in FIG. 3, glued to the middle of the violin, shaped to fit the width of the dowel rod bows 200 in FIG. 2. In one embodiment, the bow guide is colored and 3D printed.

Figure 3B:
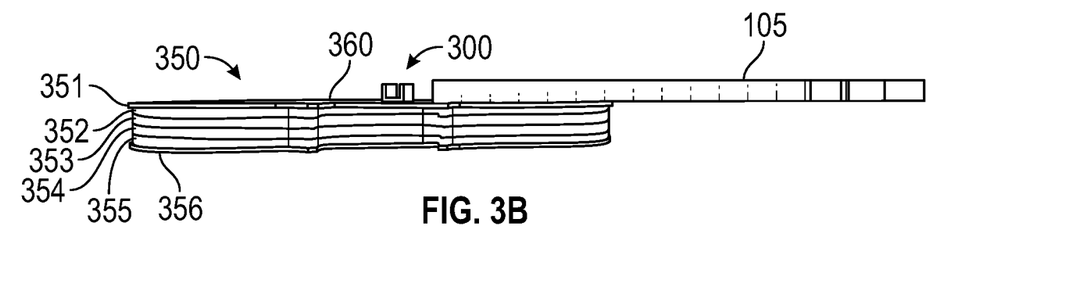
FIG. 3B shows the structure of an embodiment for a smaller violin structure.
Figure 3C:
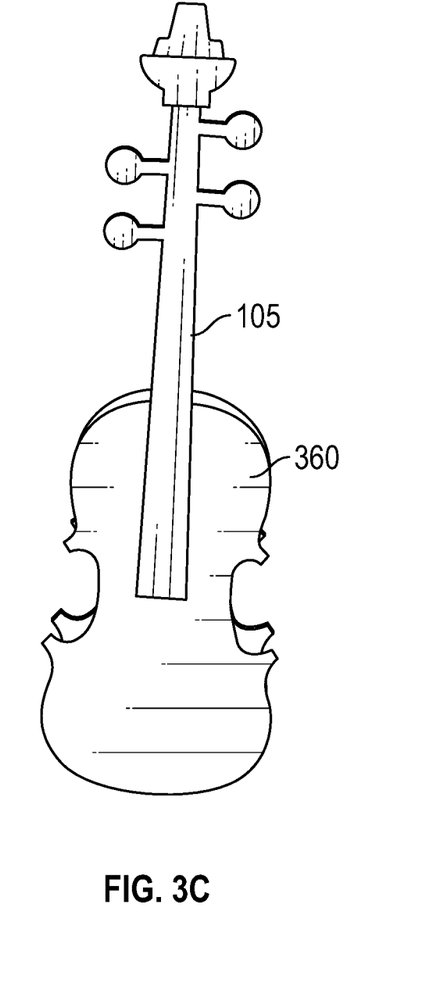
FIG. 3C shows an instrument body before stickers are applied.

Once the simulated instrument is constructed, the instrument looks like the simulated violin shown in FIGS. 3B and 3C, which shows an example instrument body, here a violin, with the different parts before the stickers have been applied. FIG. 3 shows a side view, showing the top and bottom bodies 351, 356, the sandwich pieces, 352, 353, 354, 355, sandwiched in between the top and bottom bodies 351, 356, and the fingerboard 105 attached to the top surface 360 of the top piece 351. There may also be notches in the top surface 360, so that students know where to move their bow on the strings At this point, the students attach stickers from sticker sheets 110 and 112 to the fingerboard including the scroll, pegs, and pegs box stickers, and the long fingerboard sticker. On the top body of the instrument, students will attach stickers for the two f-holes, a bridge below the bow guide, a tail piece, and chinrest.

Figure 1B:
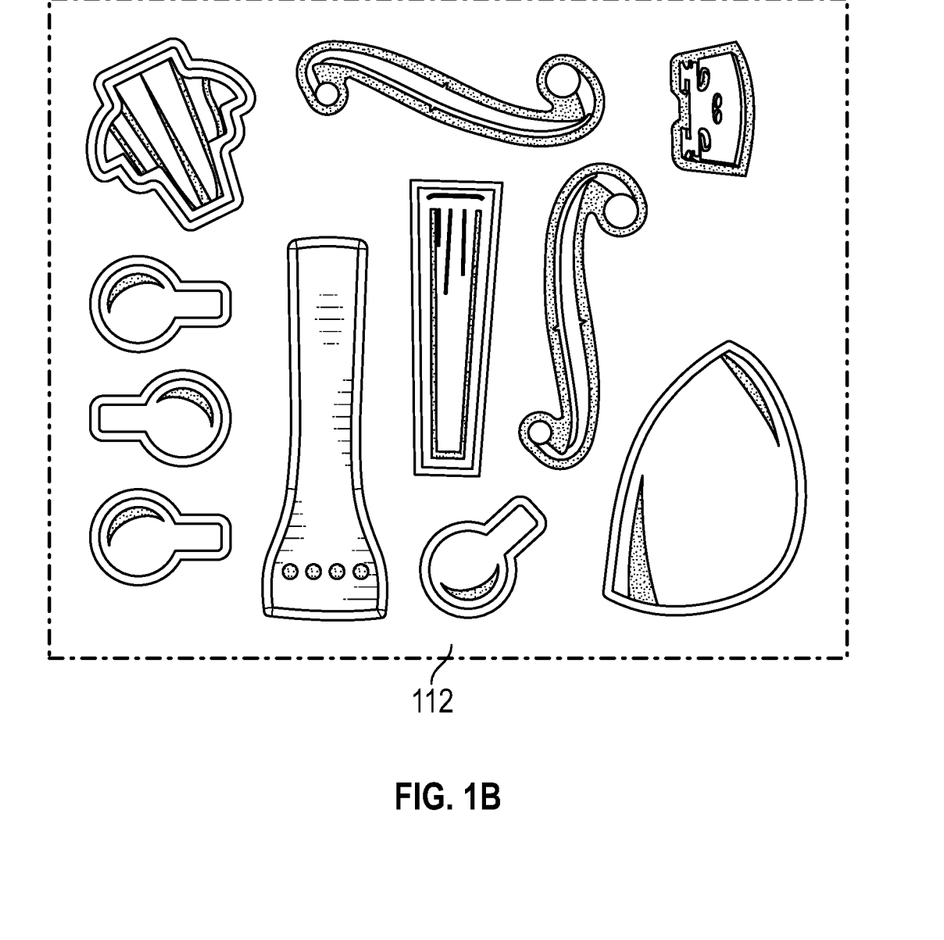
FIG. 1B shows a detail of the sticker sheet in the violin kit.
Figure 1C:
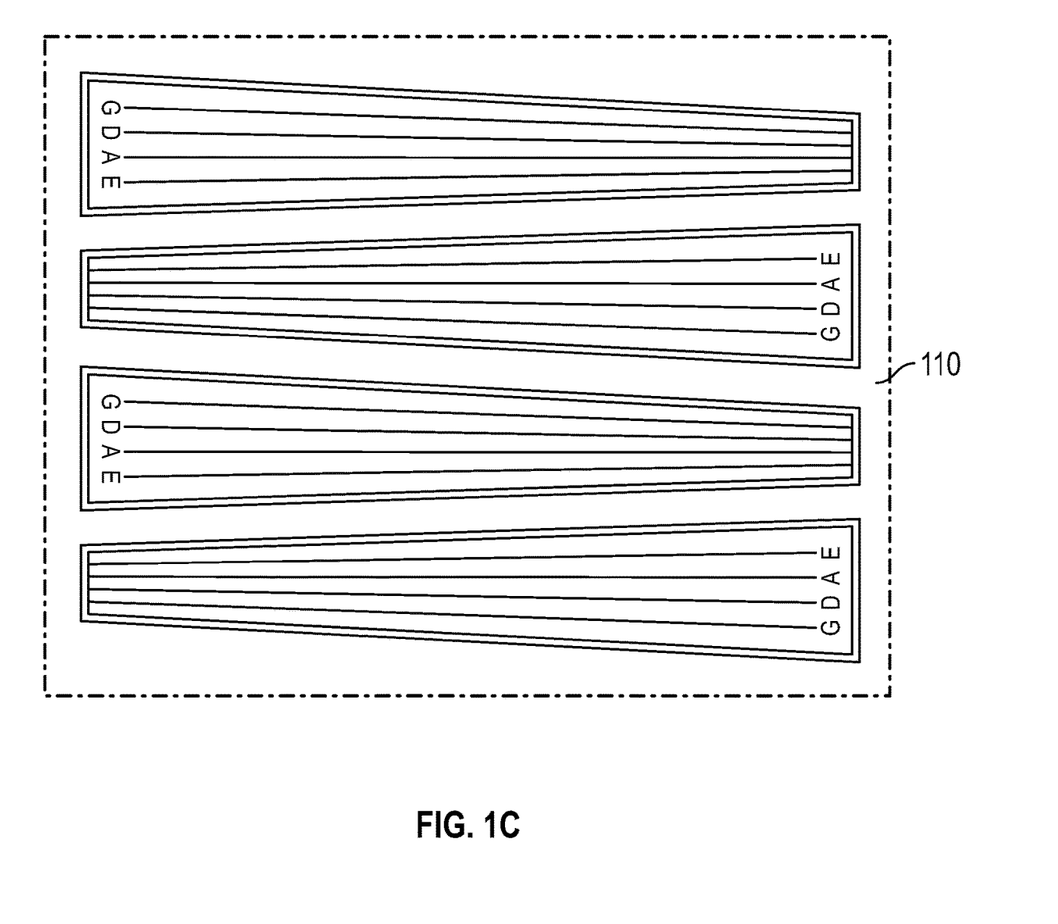
FIG. 1C shows a sticker kit for the fingerboard.
Figure 3D:
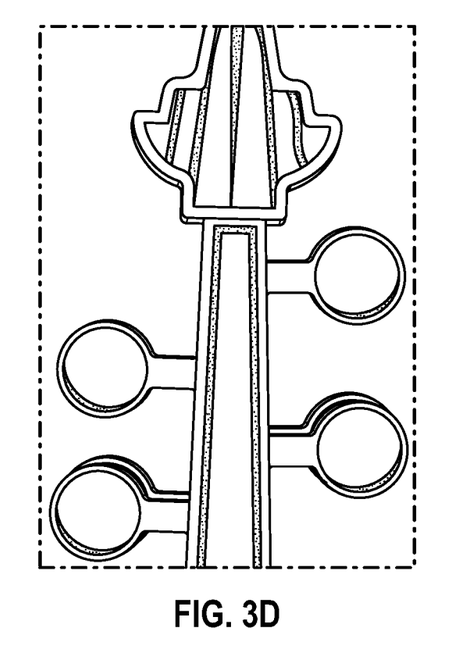
FIG. 3D shows sticker applications to the arm.
Figure 4:
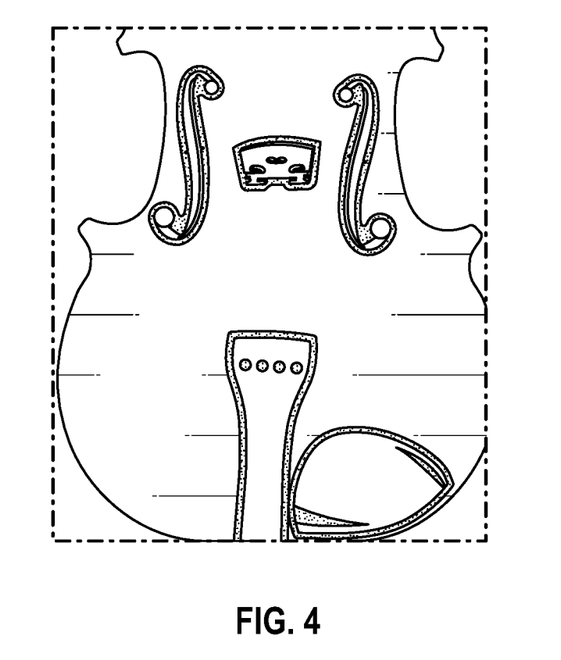
FIG. 4 shows sticker applications to the body.

FIG. 1B shows details of the stickers to be attached to the body of the violin, and FIG. 1C shows details of the stickers to be attached to the fingerboard. Note that the fingerboard stickers include labeled notes to further assist the students with understanding their instrument. FIG. 3D shows how the different stickers can be applied to the neck of the simulated instruments. FIG. 3E shows the different stickers being applied to the body of the instrument.

The simulated bow is shown in FIG. 2. A dowel rod 200 is provided with a fitted color frog 205, a bow guide 300 in FIG. 3, In an embodiment, the bodies, sandwiches and fingerboard are made from cardboard. The dowel rod in an embodiment can be made from a wooden dowel rod. A 3D printed colored frog is attached at the bottom.

Box violins and other string instruments are created by perfectly measuring every inch of the 8 fractional and full-size real violins. Then, a CAD designer creates DXF files that are laser cut to an exact replica of the violin. All of the bodies, sandwiches, and fingerboards are constructed out of cardboard. The bodies are made with ⅛ of an inch cardboard, the sandwiches ¼ of an inch, and the fingerboard ⅝ of an inch. Glue dots are included in the kit to help students, along with instructions so that a student can construct the violin kits with adult supervision.

The bows are cut by a carpenter to the exact size of the fractional to full-size length bows. The materials used are wooden dowel rods. The frogs and bow guides are also constructed and rendered via CAD drawings into STL files and printed with a 3D printer. The frogs are glued onto the bows. The violin bows are 5/16 in diameter. Other embodiments use injection molding or other efficient and cost effective methods of printing to form the frogs.

FIG. 3B illustrates the overall construction of the simulated instrument. The layers described above from top to bottom includes a top body, 3 to 4 of the sandwich elements depending on the desired thickness, and the bottom body. The fingerboard is attached to the top surface of the top body. The bow guide is also attached to the top surface, forming the simulated instrument as shown in FIG. 3B from its side.

Box Violas, box cello simulators, and box basses are created in the same way, using a larger template.

Figure 5:
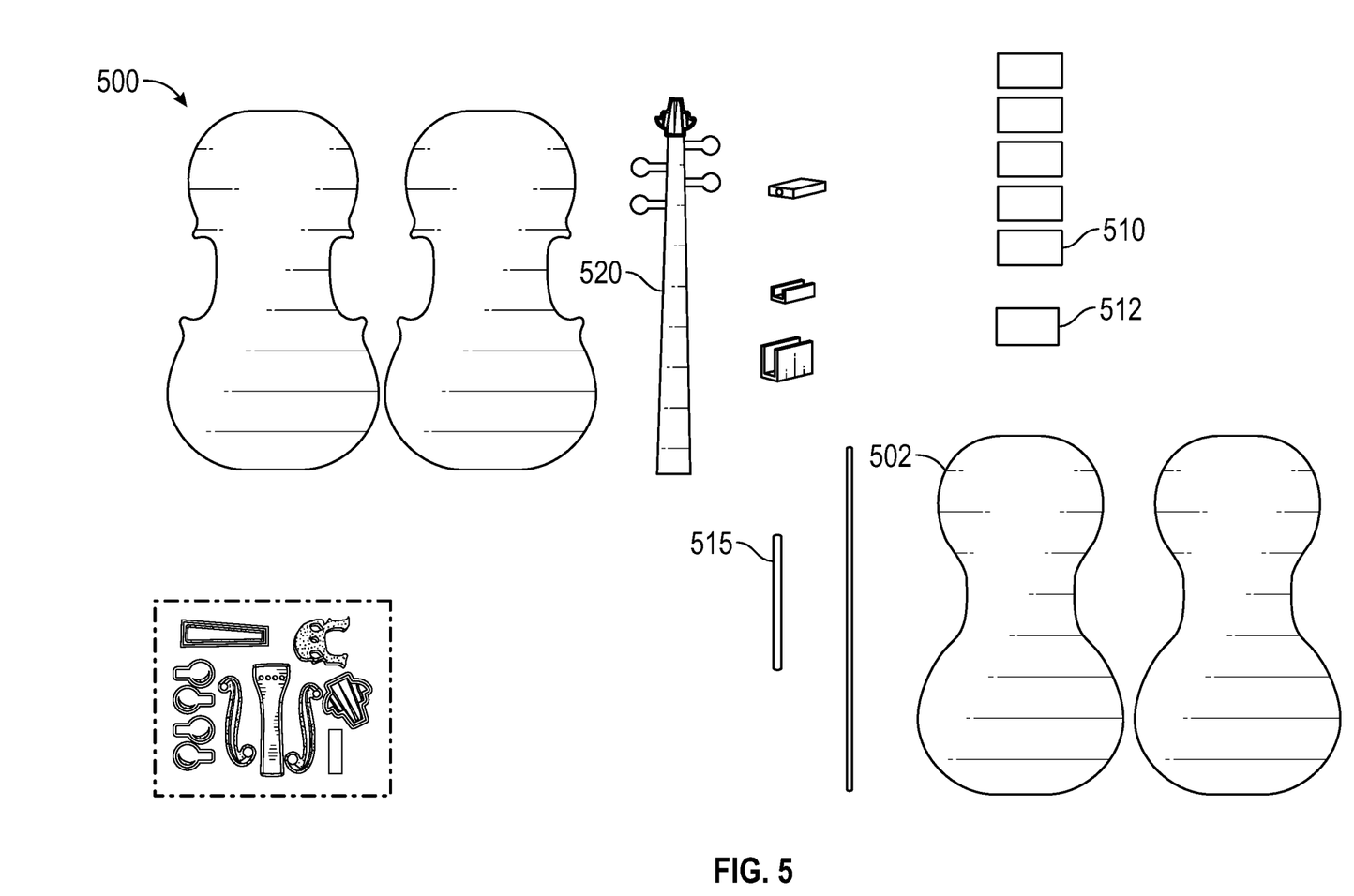
FIG. 5 shows an embodiment for a larger structure including a box cello kit.

Box Cello and box bass simulators are formed as shown in FIG. 5.

There are 2 cardboard bodies 500 that are shaped in the body of real cellos that make-up the top and bottom of the instrument. The top body has a 3D printed colored bow guide shaped to fit the width of the dowel rod bows. There are two cardboard sandwiches 502 for each cello. In addition, a set of squares/rectangles 510, 512 are used to provide additional height to the simulated device. The squares and rectangles are used in the box cellos instead of the sandwich layers.

On the bottom half between the squares is an end pin 515 constructed out of wood and is 4.25 inches long, and 1.75 tall and 0.75 wide. The middle of the end pin has a round hole drilled through it that is ⅜th inch in diameter. There is an 18 inch wooden dowel rod that runs through the hole that is adjustable, and there are metal wing nut attachments to help screw and loosen the wooden dowel rod. When the student is ready to play, the wooden dowel rod can be extended, and when they are done, it can be retracted back into the cello.

The top half of the cello also has 3 cardboard squares to match the height of the front squares. There is also a fingerboard that is attached once the bodies and the sandwiches are constructed. Once all of that is constructed, students will attach stickers to the fingerboard placing the scroll, pegs, and pegs box on. On the body of the instrument students will attach two f-holes, a bridge below the bow guide, and a tail piece. The bows are cut out of wooden dowel rods, and a 3D printed colored frog.

Figure 6:
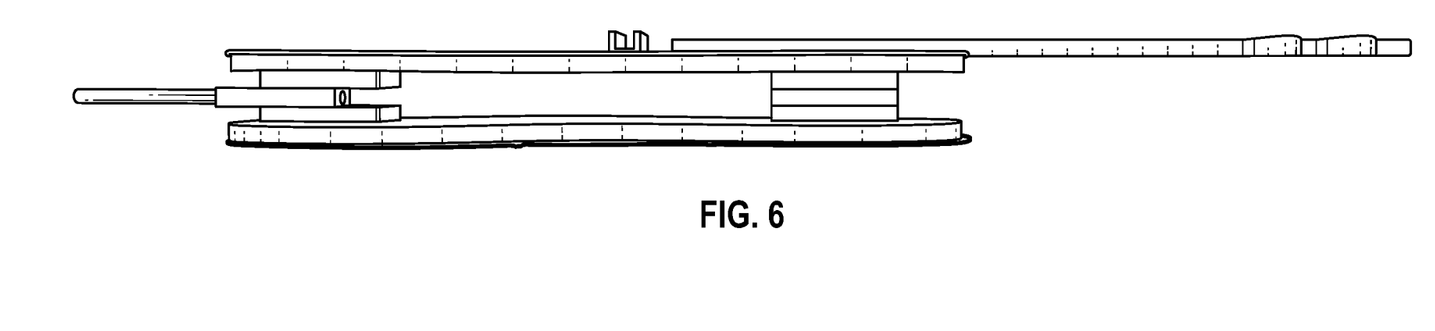
FIG. 6 shows a side view of the larger kit assembled.

FIG. 6C shows the assembled simulated instrument. The top and bottom half of the instrument device are not necessarily symmetrical. Stacked rectangles with ⅛ inch rectangles are located between the top half of the top and bottom bodies. The layers for the bottom half include ⅝ inch rectangles with the end pin.

The present system has a number of new and improved features.

3D printed bow lanes in small, medium, and large sizes, and in various colors are used.

3D printed bow frog in small and large sizes, and in various colors are used.

Sizes range from fractional to full size instruments. All sizes of violins/violas include: 1/32, 1/16, 1/10, ⅛, ¼, ½, ¾, and Full size. All sizes of Cellos currently include 1/16, 1/10, ⅛, ¼, ½, ¾, and Full size. The bass option will be available in 1/64, 1/32, 1/16, 1/10, ⅛, and ¼.

Every instrument comes with correctly-sized stickers representing the different parts of the instruments, including the scroll, pegs, pegbox, fingerboard, bridge, f-holes, chinrest, nut, strings, tailpiece, and fine tuners.

Working wooden endpin that stabilizes the bass and cello.

Wooden bows that correspond to the correct size instrument

My invention offers students and their teachers or families the opportunity to construct the instruments so that they are able to have a positive, hands-on learning experience that establishes a connection to their instrument, while learning the parts of the violin.

As students put the stickers with different parts of the instrument onto the corresponding part of the trainer instrument, they will learn the names and parts of the instrument, which will help them to remember the instrument parts as they continue to play later on.

My instruments are made primarily of cardboard, but also include components that are wooden, metal, and 3D printed thermoplastic, which are sturdy and durable materials which will last longer for students and be available for use by multiple students.

My 3D printed bow lanes and frogs come in multiple fun colors, which are visually appealing to students.

My series contains a wide range of sizes for violin, viola, and cello, (see 2f for list), and also includes a Box Bass.

My cello and bass include a working endpin which offers stability for the instrument.

Figure 7A:
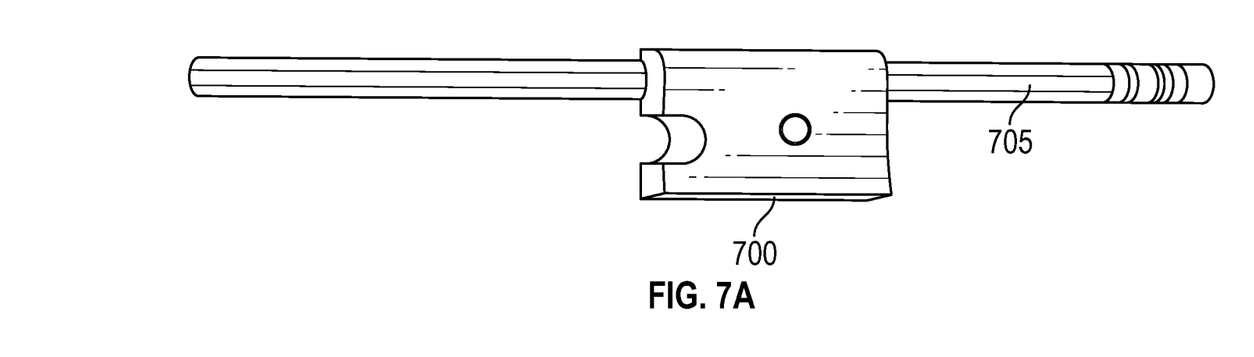
FIGS. 7A and 7B show an alternative embodiment of a mini bow.

According to another embodiment, it is noted some students struggle to make a correct bow hand on a dowel rod. In order to address this issue noted by the inventor, an embodiment shown in FIGS. 7A and 7B, adds a transitional practice frog prior to going to a dowel rod practice bow or a real bow to aid those students. This enables students to develop correct bow hand formation on something lighter than a dowel rod. The mini bow is preferably less than half the size of a real bow, meaning, half or less the diameter for the bow rod, half or less the length, and having a frog device close to the size of the real bow frog. As described herein, the bow can be as smaller as 1/32, or even smaller.

In addition to our practice dowels and frogs explained above, the practice frog series will have a design where the frog 700 slides onto a pencil 705 and or similarly size dowel rod, or any other round, long object that mimics a bow that we find satisfactory. The rod used can be 7 mm diameter and 19 cm long, or less or more, like a #2 pencil. The frog 700 has an opening that fits the rod, and will essentially act as a "sock" that simply slide on with a tube and a violin, viola, cello, and bass frog. All of these practice frogs are preferably 3D printed or injection molded, and be offered in multiple colors.

The embodiments contemplate multiple versions of this mini-bow. One version of our practice frogs will come with the divot 710 that occurs in a real frogs, so that students who struggle to know where there thumb placement goes, can learn on a frog over a pencil or other round, long object. Other frogs do not have the divots. Those frogs will simply be in the shape of a rectangular frog as established above. Our two main frame works are French Frogs, on the violin, viola, cello and double bass bows. In addition to this, Double Basses will get the option of the world's first German trainer simulated, e.g 3D printed, Bow. The frogs for the many variations of bows in our trainer bow series will be available to slide over a pencil.

In an embodiment, the length of the mini bow that is fractional to a real bow, but the frog is close to the actual size of a real violin/viola/cello/bass frog. The frog size being similar in size to a real bow frog is important for teaching students how the hand wraps the frog around to make the bow hand; the length of the rod is of less importance for teaching, so the rod is short on the mini-bow and the frog slide uses a pencil. The length of the mini-bow rod is the same regardless of which of the 4 different frog sizes is used The Frog Slide 700 in FIG. 7A slides onto a number 2 pencil, and acts as a "sock" that simply slides onto the pencil for violin, viola, cello, and bass. Embodiments use a traditional French bow shape for violin, violin, cello, and bass, and also a German bow shape for the bass. Students can make a bow hand with the pencil functioning as the same shape as a real or dowel bow, allowing the fingers to make the correct shape around the frog slide and to make contact against the pencil in the same way it would on real bow or dowel bow.

The violin & viola frog slides come in a small and large version. The small version is for younger students on smaller instruments from 1/32-¼ size. The large version is for students who are ½ to 4/4 size. The cello and bass version are thicker and larger than the violin and viola version, also serving smaller students from 1/32-¼ size, and larger students ½-4/4 sizes. The German frogs also come in a small and large size, serving small students from 1/32-¼ size, and large sizes ½-4/4. Students can practice their bow hands from anywhere, and will have more success as they transition to the dowel or real bow.

Figure 7B:
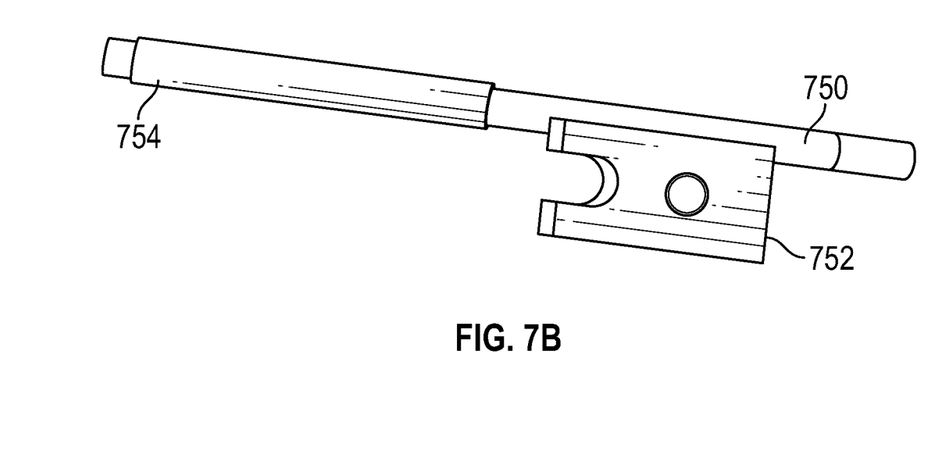

The one piece Mini Bow shown in FIG. 7B is another embodiment of the mini bow. This device is a one piece device 750 in the shape of the bottom half of a string instrument bow. Unlike the Frog Slide which is just the frog portion of the bow, the Mini Bow includes the bow grip, screw, and hexagonal shape stick 754 of a real bow. There is a thinner stick 754 for the violin and viola Mini Bow, and a thicker stick for the cello and bass Mini Bow. There are also two frog sizes for the Mini Bows for violin, violin, cello and bass, in addition to French and German frog shapes. The stick of the bow, which is everything except the frog is the same exact length regardless of the size of the bow, while the size of the frog is what changes according to size.

The small French and German frog accommodates small students on instruments sizes 1/32-¼, while the large size is for students on instrument sizes of ½-4/4. The Mini Bow is small enough that students can practice their bow hands from anywhere.

Both the frog slides and the one piece Mini Bows are the perfect practical and portable tool for perfecting the bow hand before transitioning to the real bow or dowel rod bow. By perfecting the bow hand with our light weight tools, students will be able to pull a beautiful sound from their bow instruments or real instruments with ease and precision, increasing the success of students right away. It can take years to learn how to play a string instrument at a high level.

The Mini Bow and Frog Slide increases success for sound production and muscle memory so that students can create a beautiful tone much quicker thus resulting in better retention in the long run of beginner string students.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A transitional practice mini-bow for a stringed instrument, comprising:
   a frog portion,
   the frog portion having inner surfaces defining an opening that slides over and holds to an elongated object that mimics a bow,
   to form a simulated mini bow from the frog portion and the round elongated object,
   where the simulated mini bow is fractionally smaller than a full size bow for the stringed instrument by a fraction,
   and where the round elongated object has a length of the elongated object that is shorter than the length of the full sized bow by the amount of the fraction.

2. The device as in claim 1, wherein the frog includes a divot for defining thumb placement.

3. The device as in claim 1, wherein the frog includes a rectangular frog.

4. The device as in claim 1, wherein the elongated object is a #2 pencil and where the opening slides over and around the 2 pencil.

5. The device as in claim 1, wherein the rod is in a French bow shape for violin, viola, cello or bass.

6. The device as in claim 1, wherein the rod is in a German bow shape for a bass.

7. The device as in claim 1, wherein the rod is hexagonal in outer cross section.

8. A transitional practice mini-bow for a stringed instrument, comprising:
   a frog portion, having a surfaces for holding;
   an elongated object, attached to the surfaces for holding of the frog, to form a shape that mimics a stringed instrument bow,
   to form a simulated mini bow from the frog portion and the elongated object,
   wherein the elongated object has a length which is ½ or less a length of a full sized stringed instrument bow.

9. The mini bow as in claim 8, wherein the elongated object is ¼ or less the size of the full sized stringed instrument bow and has the length which is the ¼ or less of the length of the full sized stringed instrument bow.

10. The mini bow as in claim 8, wherein the elongated object is a number two pencil.

11. The mini bow as in claim 8, wherein the elongated object is a dowel.

12. The mini bow as in claim 8, wherein the frog portion, and the cylindrical elongated object are formed of a single piece of material.

13. The device as in claim 1, wherein the elongated object is a dowel, and where the opening slides over and completely around the dowel.

* * * * *